United States Patent [19]
Wissmach et al.

[11] Patent Number: 6,069,810
[45] Date of Patent: May 30, 2000

[54] METHOD FOR REDUCING FEEDBACKS ON A FLOW OF CURRENT DRAWN FROM A NETWORK DURING OPERATION OF INDUCTIVE LOAD AND A BOOSTER CONVERTER FOR DRIVING MOTORS IN ACCORDANCE WITH THE METHOD

[75] Inventors: Walter Wissmach, Munich, Germany; Roland Schaer, Grabs, Switzerland; Alexander Nachbaur, Fraxern, Austria

[73] Assignee: Hilti Aktiengesellschaft, Schaan, Liechtenstein

[21] Appl. No.: 09/036,213

[22] Filed: Mar. 6, 1998

[30] Foreign Application Priority Data

Mar. 6, 1997 [DE] Germany ............ 197 09 264

[51] Int. Cl.[7] ............ H02M 7/5387
[52] U.S. Cl. ............ 363/132; 363/60
[58] Field of Search ............ 363/59, 60, 86, 363/124, 125, 126, 132

[56] References Cited

U.S. PATENT DOCUMENTS

| | | | |
|---|---|---|---|
| 4,386,299 | 5/1983 | Pham | 318/261 |
| 5,146,398 | 9/1992 | Vila-Masot et al. | 363/89 |
| 5,563,487 | 10/1996 | Davis | 318/701 |

*Primary Examiner*—Adolf Deneke Berhane
*Attorney, Agent, or Firm*—Brown & Wood, LLP

[57] ABSTRACT

A method of reducing feedbacks on a temporary flow of current drawn from a network, during an operation of an inductive load, by active filtering of harmonics of a network fundamental component with a booster converter (6) and according to which the function of a necessary choke of the booster converter is taken up, at least partially, by the inductive load; and a booster converter for effecting the method, in which the function of the booster converter is integrated into the inductive load driving bridge circuit and into the motor, with at least one motor winding being so connected that it replaces, at least partially, the conventional booster converter choke.

21 Claims, 2 Drawing Sheets

METHOD FOR REDUCING FEEDBACKS ON A FLOW OF CURRENT DRAWN FROM A NETWORK DURING OPERATION OF INDUCTIVE LOAD AND A BOOSTER CONVERTER FOR DRIVING MOTORS IN ACCORDANCE WITH THE METHOD

BACKGROUND OF THE INVENTION

1. Field of the Invention

The present invention relates to a method of reducing feedbacks on a temporary flow of current drawn from a network, during an operation of an inductive load, with a rectifying circuit, wherein the method including active filtering of harmonics of a network fundamental component with a booster converter.

The present invention also relates to a booster converter implementing the method according to the present invention.

2. Description of the Prior Art

With many electronic apparatuses, in particular, power supply units, control gear, drive control units of all types and the like, the network a.c. voltage is rectified and is smoothed, e.g., with a capacitor. When a load is applied to the rectified d.c. voltage, the d.c. voltage becomes more or less ripple, and the temporary flow of the current drawn from the network substantially deviates from a sinusoidal shape and has a relatively high harmonic component. The so-called network feedbacks obviously depend on a type of the load and its current consumption. Mandatory standards prescribe threshold values or threshold curves for an allowable harmonic component dependent on the operating current.

For reducing or for eliminating such network feedbacks, filter circuits are used which are connected between a network rectifier and the load. A known active filter circuit is shown in FIG. 6. A so-called booster converter and a power factor control circuit (not shown in FIG. 6) make it possible to draw from a network, within allowable power limits and independent of possible variations of the load, current of an approximately sinusoidal shape. The booster converter includes connected, between the output of a network rectifier (6) with a smoothing capacitor (4) and a further smoothing capacitor (5), a choke (1) (a high set-up choke), a diode (3), and a shunt arm of a capacitor (5). Between the choke (1) and the anode of the diode (3), there is provided another shunt arm in a form of an electronic switch (2) actuated by the power factor control circuit. In addition, as shown in FIG. 6, a passive prefilter (7) is arranged in front of the network rectifier (6). The above described active-passive feedback filtering circuit shown in FIG. 6 is described in an article of M. Herfurth, "Active Harmonic Filtering for Line Rectifiers of Higher Output Power," Siemens Components 1/86, p.p. 9–13.

The known network feedback filter presents a problem when the available space is limited and when an apparatus, in particular, a hand-held tool is required to have the smallest possible weight. This is because the choke requires a relatively large and heavy core layout, in particular for drawing a greater power from the network. In the circuit shown in FIG. 6, the choke (1) conducts a d.c. network current. Therefore, the choke should be designed magnetically for a highest current magnitude, i.e., for a maximal amplitude plus a superimposed ripple.

Accordingly an object of the present invention is to provide a method and a power feed circuit which reliably prevent undesirable feedbacks, which act, via the rectifier, on a temporary flow drawn from a network current during operation of an inductive load, wherein the method and the power feed circuit include a filter arrangement having definite advantages with regard to technical expenditures and weight in comparison with conventional network feedback filtering circuits.

SUMMARY OF THE INVENTION

The technical principle, which forms a basis of the present invention, is based on a recognition that the function of the choke of an active network feedback filter can be taken up, in a circuit according to FIG. 6, by an inductive load without adversely affecting the function of the load, e.g., by providing one or more a motor windings when a motor forms the inductive load.

According to the present invention, there is provided a method for reducing feedbacks on a temporary flow of current drawn from a network, during an operation of an inductive load, with a rectifying circuit including active filtering of harmonics of a network fundamental component with a booster converter, and substituting at least a portion of an inductance necessary for the booster converter with an inductance of the inductive load itself. When a motor, which forms an inductive load, is driven via a bridge circuit, according to the present invention, at least one motor winding can take up the function of the inductance for the booster converter. Accordingly, the necessary control can be integrated into the bridge circuit.

A booster converter, which implements the inventive method, can be used for driving different motors.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
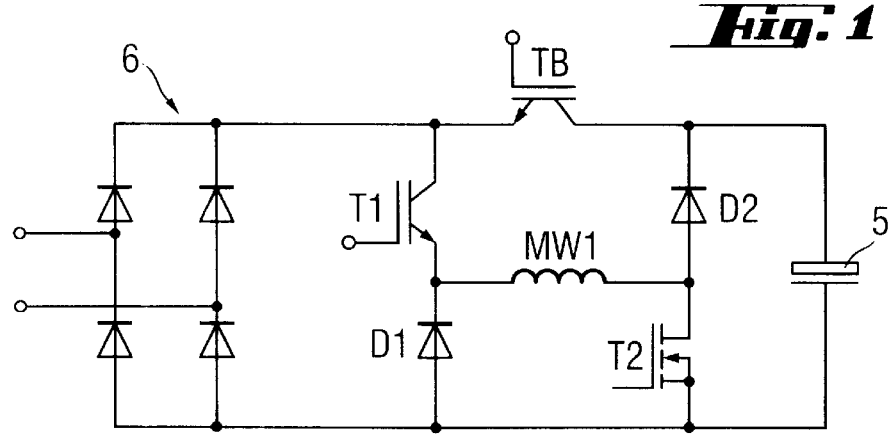
FIG. 1 shows a circuit diagram of a power feed circuit with a rectifying circuit and a booster converter for electric motors, in which the choke function is taken up by a motor winding in accordance with the invention.

In the drawings, the same elements are designated with the same reference numerals.

FIG. 1 shows a circuit diagram of a power feed circuit including a rectifying circuit 6 and a booster converter according to the present invention for electric motors, in which the choke function is taken up by a motor windings MW1.

The motor winding MW1 is driven via a bridge circuit which includes, as a first branch, a series connection of a first diode D1 and a first transistor T1 the emitter of which is connected with the cathode of the diode D1. The anode of the first diode D1 is connected with the ground, and the collector of the first transistor T1 is connected with the distribution voltage. The base of the first transistor T1 is connected with a control circuit (not shown). The second branch of the bridge circuit is formed by a series connection of a second diode D2 and of a second transistor T2 the collector of which is connected with the anode of the second diode D2. The cathode of the second diode D2 is connected via a collector-emitter route of a transistor TB with the distribution voltage, and the emitter of the second transistor T2 is connected with the ground. The base of the second transistor T2 is connected with the control circuit. The motor winding MW1 taps the bridge circuit voltage between connection points of the first transistor T1 and the first diode D1 and the second transistor T2 and the second diode D2, respectively. The base of the transistor TB, like the bases of the first and second transistors T1 and T2, is also connected with the control circuit. The booster converter includes further a capacitor 5 which is connected parallel to the branch of the bridge circuit formed by the second diode D2 and the second transistor T2.

In this embodiment, the motor winding is magnetized, in a first phase, with a high capacitor voltage of the capacitor 5 via the first transistor T1, the second transistor T2 and the transistor TB of the booster converter. When the magnetization is terminated, in a second phase, the transistor TB of the booster converter is blocked, while the second transistor T2 is clocked with a pulse width modulation by the control circuit, and the first transistor T1 remains in a conductive state. In this phase, the motor winding MW1 is also used for correction of the power factor. For the demagnetization, all three transistors T1, T2 and T3 are blocked, and the current of the motor winding MW1, in a third phase, can flow freely through both diodes D1 and D2 and the capacitor 5, whereby the motor windings MW1 is demagnetized. The control circuit directly controls the first transistor T1, the second transistor T2, and the transistor TB.

Figure 2:
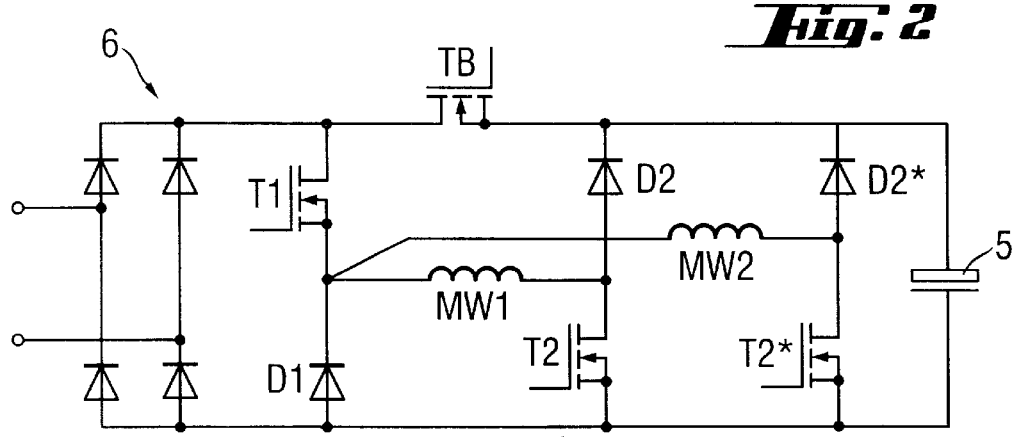
FIG. 2 shows a circuit diagram of a power feed circuit with a rectifying circuit and a booster converter for electric motors, in which the choke function is taken up by two motor windings, in accordance with the invention.

FIG. 2 shows a circuit diagram of a power feed circuit including a rectifying circuit 6 and a booster converter for electric motors, in which the choke function is taken up by two motor windings TW1 and TW2.

In contrast to the embodiment shown in FIG. 1, the two motor windings MW1 and MW2 are driven via a bridge circuit that includes two connected in parallel second branches, with the motor windings MW1 and MW2 being connected between a connection point of the first diode D1 and the first transistor T1 and, respectively, between connection points of the second diode D2 and the second transistor T2 and another second diode D2* and second transistor T2*. The base of the another second transistor T2*, as the base of the second transistor T2, is also connected with the control circuit.

In this embodiment, the motor winding MW1 is magnetized with the high capacitor voltage of the capacitor 5 via the first transistor T1, the second transistor T2 and the transistor TB while the current in the motor winding MW2 can flow freely through the transistor T1, the another second diode D2* and the transistor TB, whereby the motor winding MW2 is demagnetized. Correspondingly, when the motor winding MW2 is magnetized with the high capacitor voltage of the capacitor 5 via the first transistor T1, the another second transistor T2* and the booster converter transistor TB, while the current in the motor winding MW1 can flow freely via the first transistor T1, the second diode D2 and the transistor TB, whereby the motor winding MW1 is demagnetized. The second transistors T2 and T2* are clocked alternatively with a pulse width modulation when the respective motor windings MW1, MW2, which are controlled via these transistors, are magnetized. Accordingly, the motor windings MW1 and MW2 can be used for correction of the power factor.

A particular advantage of this embodiment consists in that the control circuit, which is not shown, does not require any additional significant expenses associated with additional control and regulating functions.

Figure 3:
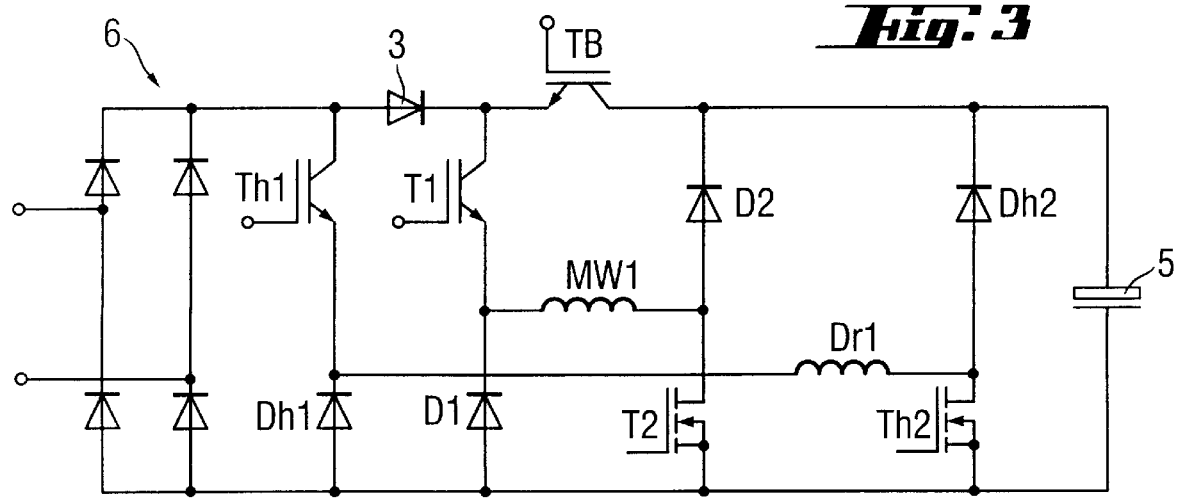
FIG. 3 shows a circuit diagram of a power feed circuit with a rectifying circuit and a booster converter according to the present together with an auxiliary choke, for electric motors, in which the function of an original choke is taken up by a single motor winding only partially in accordance with the invention.

FIG. 3 shows a circuit diagram of a power feed circuit with the rectifying circuit 6 and the inventive booster converter for the electric motors in which the choke function is taken up by the motor winding MW1 and an auxiliary choke Dr1.

The circuit shown in FIG. 3 includes, in addition to the elements corresponding to those of the circuit shown in FIG. 1, a third diode 3, connected, in series, in the flow direction between the distribution voltage and the motor driving bridge circuit, and an additional bridge circuit the bridge voltage of which it tapped from an auxiliary choke Dr 1. The additional bridge circuit has, as a first branch, a series connection of a fourth diode Dh1 with a fourth transistor Th1 the emitter of which is connected with a cathode of the diode Dh1. The anode of the fourth diode Dh1 is connected with the ground, and the collector of the fourth transistor Th1 is connected with a connection point of the distribution voltage and the anode of the third diode 3. The second branch of the additional bridge circuit is formed of a series connection of a fifth diode Dh2 and a fifth transistor Th2 the collector of which is connected with the anode of the fifth diode Dh2. The cathode of the fifth diode Dh2 is connected, via a collector-emitter route of the third transistor TB of the booster converter, with the distribution voltage the emitter of the fifth transistor Th2 is connected with the ground. The auxiliary choke Dh1 is connected between the connection point of the fourth transistor Th1 and the fourth diode Dh1 and the connection point of the fifth transistor Th2 and the fifth diode Dh2. The bases of the fourth and fifth transistors Th21 and Th2, like those of the first and second transistors T1 and T2, are connected with the control circuit.

In this embodiment, the motor winding MW1 is connected as it is connected in the embodiment of FIG. 1. During the pulse intervals of the motor current, the auxiliary choke Dr1 is magnetized via the fourth transistor Th1 and the fifth transistor Th2 which is clocked with pulse width modulation.

Figure 4:
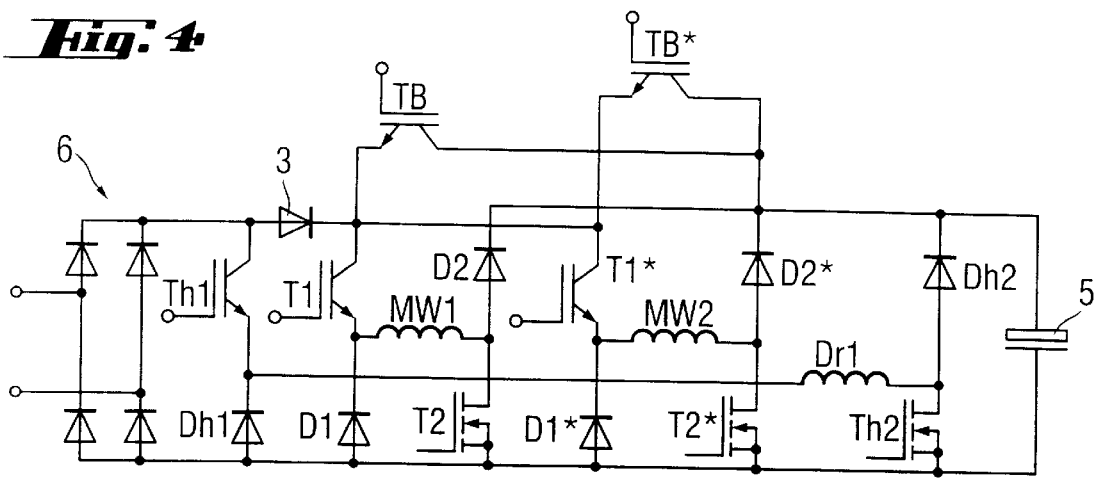
FIG. 4 shows a circuit diagram of a power feed circuit with a rectifying circuit and a booster converter together with an auxiliary choke, for electric motors, in which the function of an original choke is taken up by two motor windings only partially, in accordance with the invention.

By assigning the power factor regulating function to both the motor winding MW1 and the auxiliary choke Dr1, the auxiliary choke Dr1 can be designed for handling of a current about 30° smaller than a choke of a conventional booster converter. Further, a necessary prefilter, which is not shown, can be made much smaller than it can in circuits without an auxiliary choke. FIG. 4 shows a circuit diagram of a power feed circuit with the rectifying circuit 6 and the inventive booster converter with an auxiliary choke Dr1 for the motor, with which the function of an original choke is taken up to a large extent by two motor windings MW1 and MW2.

In contrast to the embodiment shown in FIG. 3, the bridge circuit for driving the motor winding MW1 and the third transistor TB is connected parallel to a second bridge circuit for driving the second motor winding and another third transistor TB*. Both motor windings MW1 and MW2 are wired in the same manner. The transistors T1* and T2* of the second bridge circuit and the third transistor TB* are controlled in the same way as the corresponding transistors T1, T2 and TB.

The motor windings MW1 and MW2 are connected in the same way as in the embodiment of FIG. 2. During the magnetization of the motor windings MW1 and MW2, the auxiliary choke Dr1 is clocked with pulse width modulation through the fourth and fifth transistors Th1 and Th2 and is also magnetized.

When the motor winding MW1 is magnetized with the high capacitor voltage of the capacitor 5 via the first transistor T1, the second transistor and the third transistor TB, the current in the motor winding MW2 can flow freely for a long time via the transistor T1*, diode D2* and the transistor TB, or the motor winding MW2 can be rapidly demagnetized via diodes D1*, D2* and the capacitor 5. Correspondingly, the current in the motor winding MW1 can flow freely via the transistor T1, the diode D2 and the transistor TB, or the motor winding MW1 can be demagnetized via the diodes D1 and D2 and the capacitor 5 while the motor winding MW2 is magnetized with the high capacitor voltage of the capacitor 5 via the first transistor T1*, the second transistor T2* of the second bridge circuit as well as through the transistor TB*.

By assigning the power factor regulating function to two motor windings MW1 and MW2 and the auxiliary choke Dr1, the auxiliary choke Dr1, in comparison with a choke of a conventional booster, can be designed for handling a current about 70% smaller. Also, a necessary prefilter, can also be made smaller than in a circuit without an auxiliary choke.

The circuit of FIG. 2 can so be wired with, the aid of an electronic switch (TB* and T1*), in the same way as the circuit of FIG. 4, such that respective motor windings are rapidly demagnetized, with the transistor TB being switch on (or being in a conductive state), over the capacitor 5 and not over the transistor TB.

Figure 5:
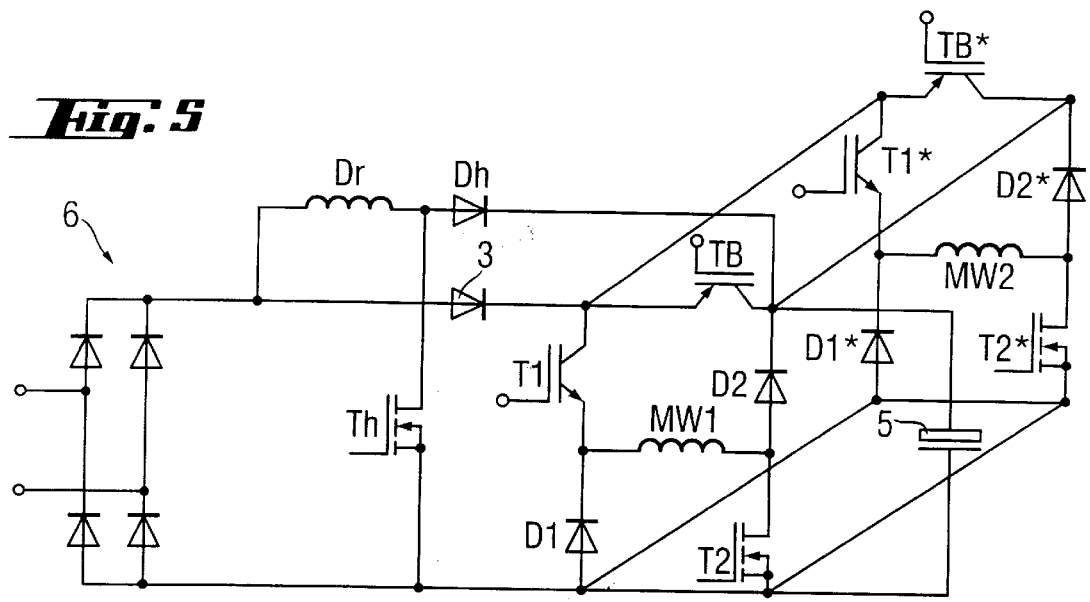
FIG. 5 shows a simplified circuit diagram of a power feed circuit with a rectifying circuit and a booster converter, together with an auxiliary choke, for electric motors, with which the function of an original choke is taken up by two motor winding in accordance with the invention.
Figure 6:
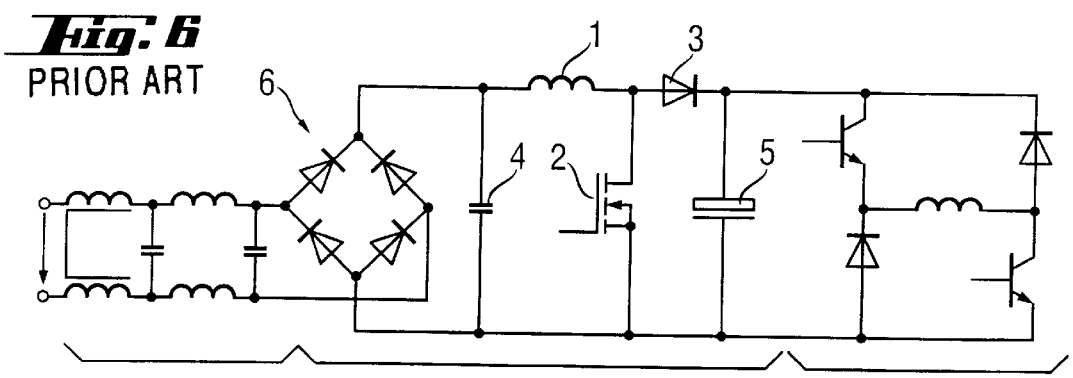
FIG. 6 shows a principle circuit diagram of a power feed circuit with a rectifying circuit, a booster converter and a prefilter.

The above-described circuits can also be changed such that the fourth transistor Th1 is replaced by a short circuit impedance, and the fourth diode Dh1 is replaced by a no-load. This change for the circuit shown in FIG. 4, is represented by the circuit shown in FIG. 5.

A further simplification of the previously described circuit embodiments is achieved by replacing first diodes D1, D1* by a no-load.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A method of reducing feedbacks on a temporary flow of current drawn from a network, during an operation of an inductive load, with a rectifying circuit, comprising the steps of active filtering of harmonics of a network fundamental component with a booster converter; and substituting at least a portion of an inductance necessary for the booster converter with an inductance of the inductive load itself.

2. A method according to claim 1, wherein the inductive load is a motor driven via a bridge circuit, and wherein at least one motor winding (MW1; MW1, MW2) is used as the booster converter inductance.

3. A method according to claim 2, wherein a booster converter function is integrated in the motor driving bridge circuit and in the motor, whereby the at least one motor winding (MW1) is substituted for the booster converter inductance.

4. A method according to claim 3, wherein the at least one motor winding is magnetized with a capacitor voltage of a capacitor (5) in a first phase, is used for correcting a power factor in a second phase, and is demagnetized in a third phase.

5. A method according to claim 2, wherein a booster converter function is integrated in the motor driving bridge circuit and the motor, and at least two motor winding (MW1, MW2) are substituted for the booster converter inductance.

6. A method according to claim 5, wherein in a first phase, one of the at least two motor winding (MW1) is magnetized with a capacitor voltage of a capacitor (5) in a first phase, while another one of at least two motor winding (MW2) is free-running, wherein consecutively in a second phase, the another one of the at least two motor windings (MW2) is magnetized with the capacitor voltage of the capacitor (5) while the one of the at least two winding (MW1) is free-running, and wherein the at least two motor windings (MW1, MW2) alternatively, when being magnetized, are used for correcting a power factor.

7. A method according to claim 2, wherein a booster converter function is integrated into the motor driving bridge circuit, and the at least one motor winding (MW1) and an auxiliary choke are substituted for the booster converter inductance.

8. A method according to claim 7, wherein a first phase, the at least one motor winding (MW1) is magnetized with a capacitor voltage of a capacitor (5), wherein in a second phase, the at least one motor winding (MW1) is used for correcting, via an electronic switch (T2), a power factor, and wherein in a third phase, the at least one motor winding (MW1) is demagnetized while the auxiliary choke (Dr1) is magnetized, during the pulse intervals of motor current, by a pulse width modulation.

9. A method according to claim 2, wherein the booster converter function is integrated in the motor driving bridge circuit and in the motor, and wherein at least two motor winding (MW1, MW2) and an auxiliary choke (Dr1) are substituted for the booster converter inductance.

10. A method according to claim 9, wherein in a first phase, one of the at least two motor windings (MW1) is magnetized with a capacitor voltage of a capacitor (5) while another one of the at least two motor winding (MW2) is free-running; wherein subsequently in a following phase, the another one of the at least two motor winding (MW2) is magnetized with the capacitor voltage of the capacitor (5) while the one of the at least two motor windings (MW1) is free-running, and wherein the at least two motor windings (MW1, MW2) are alternatively used for correcting, via respective electronic switches (T2, Tw*), a power factor in magnetized conditions thereof, with the auxiliary choke (Dr1) being magnetized by pulse width modulation during magnetization of a respective one of the at least two motor windings (MW1, MW2).

11. A method according to claim 4, wherein the at least one motor winding (MW1) is capable of free-running via one of the capacitor (5) and an electronic switch (TB).

12. A method according to claim 6, wherein the at least two motor windings (MW1, MW2) are capable of free-running via one of the capacitor (5) and respective electronic switches (TB, TB*).

13. A method according to claim 8, wherein the at least one motor winding (MW1) is capable of free-running via one of the capacitor (5) and an electronic switch (TB).

14. A method according to claim 10, wherein the at least two motor windings (MW1, MW2) are capable of free-running via one of the capacitors and respective electronic switches (TB, TB*).

15. A booster converter for reducing feedbacks on a temporary flow of current drawn from a network during an operation of a motor which operation is controlled by a regulation of a power factor, the booster converter comprising:
    a bridge circuit for driving a motor winding (MW1) and having a first branch including at least one first electronic switch (T1) connected between distribution voltage and the motor winding (MW1) and having a control terminal thereof connected with a control circuit, and a second branch including a series connection of a second diode (D2; D2, D2*) and a second electronic switch (T2; T2, T2*) having a first contact thereof connected with an anode of the second diode (D2; D2, D2*), the second diode (D2; D2, D2*) having a cathode thereof connected with the distribution voltage and the second electronic switch (T2; T2, T2*) having a second contact thereof connected with a ground and having a control contact thereof connected with the control circuit, the motor winding (MW1) being connected between the first electronic switch (T1) and a connection point of the second electronic switch (T2; T2, T2*) with the second diode (D2; D2, D2*);
    the booster converter further comprising:
        a third electronic switch (TB) connecting the distribution voltage with the cathode of the second diode (D2; D2, D2*) and having a control terminal thereof connected with the control circuit;
        and a capacitor (5) connected in parallel with the second branch of the bridge circuit.

16. A booster converter according to claim 15, further comprising a first diode (D1) having a cathode thereof connected with a connection point of the first electronic switch (T1) with the motor winding (MW1), and having an anode thereof connected with the ground.

17. A booster converter for reducing feedbacks on a temporary flow of current drawn from a network during an operation of a motor which operation is controlled by a regulation of a power factor, the booster converter comprising:
    a bridge circuit for driving a motor winding (MW1) and having a first branch including at least one first electronic switch (T1) connected between distribution voltage and the motor winding (MW1) and having a control terminal thereof connected with a control circuit, and a second branch including a series connection of a second diode (D2; D2, D2*) and a second electronic switch (T2; T2, T2*) having a first contact thereof connected with an anode of the second diode (D2; D2, D2*), the second diode (D2; D2, D2*) having a cathode thereof connected with the distribution voltage and the second electronic switch (T2; T2, T2*) having a second contact thereof connected with a ground and having a control contact thereof connected with the control circuit, the motor winding (MW1) being connected between the first electronic switch (T1) and a connection point of the second electronic switch (T2; T2, T2*) with the second diode (D2; D2, D2*);

the booster converter further comprising:
        a third electronic switch (TB) connecting the distribution voltage with the cathode of the second diode (D2; D2, D2*) and having a control terminal thereof connected with the control circuit;
        a capacitor (5) connected in parallel with the second branch of the bridge circuit;
        a third diode (3) connecting the first electronic switch (T1) with the distribution voltage; and
    an auxiliary choke (Dr1) connected between the distribution voltage and a connection point of a series connection formed of a fifth diode (Dh2) and a fifth electronic switch (Th2) having a first contact thereof connected with an anode of the fifth diode (Dh2), the fifth diode (Dh2) having a cathode thereof connected with an anode of the fifth diode (Dh2), the fifth diode (Dh2) having a cathode of the second diode (D2; D2, D2*), and the fifth electronic switch (Th2) having a second contact thereof connected with the ground and having a control terminal thereof connected with the control circuit.

18. A booster converter for reducing feedbacks on a temporary flow of current drawn from network during an operation of a motor which operation is controlled by a regulation of a power factor, the booster converter comprising:
    a bridge circuit for driving motor windings (MW1, MW2) and having a first branch including at least one first electronic switch (T1, T1*) connected between distribution voltage and the motor windings (MW1, MW2) and having a control terminal thereof connected with a control circuit, and a second branch including respective series connections of second diodes (D2, D2*) and second electronic switch (T2, T2*) having a first contact thereof connected with an anode of respective second diode (D2, D2*), the second diodes (D2, D2*) having a cathode thereof connected with the distribution voltage, and the second electronic switch (T2; T2, T2*) having a second contact thereof connected with a ground and having a control contact thereof connected with the control circuit, the motor windings (MW1; MW2) being connected, respectively, between the first electronic switches (T1) and a connection point of the second electronic switches (T2; T2, T2*) with respective second diodes (D2; D2, D2*);
    the booster converter further comprising:
        a third diode (3) connecting a respective first electronic switch (T1, T1*) with the distribution voltage;
        a third electronic switch (TB, TB*) for each motor winding (MW1, MW2) and connecting, via the third diode (3), the distribution voltage with a cathode of a respective second diode (D2, D2*) of a respective bridge circuit, the third electronic switch (TB, TB*) having a control terminal thereof connected with the control circuit;
        a capacitor (5) connected in parallel with the second branch of a respective bridge circuit which is formed of a respective second diode (D2, D2*) and a respective second electronic switch (T2, T2*); and
        an auxiliary choke (Dr1) connected between the distribution voltage and a connection point of a series connection of a fifth diode (Dh2) and a fifth electronic switch (Th2) having a first contact thereof connected with an anode of the fifth diode (Dh2), the fifth diode (Dh2) having a cathode thereof connected with a cathode of the respective second diode (D2, D2*), and the fifth electronic switch (Th2) having a second contact thereof connected with the ground and having a control terminal thereof connected with the control circuit.

19. A booster converter according to claim 18, further comprising a fourth electronic switch (Th1) for connecting the auxiliary choke (Dr1) with the distribution voltage and having a control terminal thereof connected with the control circuit; and a fourth diode (Dh1) having an anode thereof connected with the ground and having a cathode thereof connected with a connection point of a fourth electronic switch (Th1) with the auxiliary choke (Dr1).

20. A booster converter according to claim 18, further comprising a plurality of first diodes (D1; D1, D1*) having cathodes thereof connected with respective connection points of respective first electronic switches (T1; T1, T1*) with respective motor windings (MW1, MW2), and having anodes thereof connected with the ground.

21. A booster converter for reducing feedbacks on a temporary flow of current drawn from a network during an operation of a motor which operation is controlled by a regulation of a power factor, the booster converter comprising:

a bridge circuit for driving a motor winding (MW1) and having a first branch including at least one first electronic switch (T1) connected between distribution voltage and the motor winding (MW1) and having a control terminal thereof connected with a control circuit, and a second branch including a series connection of a second diode (D2; D2, D2*) and a second electronic switch (T2; T2, T2*) having a first contact thereof connected with an anode of the second diode (D2; D2, D2*), the second diode (D2; D2, D2*) having a cathode thereof connected with the distribution voltage and the second electronic switch (T2; T2, T2*) having a second contact thereof connected with a ground and having a control contact thereof connected with the control circuit, the motor winding (MW1) being connected between the first electronic switch (T1) and a connection point of the second electronic switch (T2; T2, T2*) with the second diode (D2; D2, D2*);

the booster converter further comprising:
a third electronic switch (TB) connecting the distribution voltage with the cathode of the second diode (D2; D2, D2*) and having a control terminal thereof connected with the control circuit;

and a capacitor (5) connected in parallel with the second branch of the bridge circuit;

a third diode (3) connecting the first electronic switch (T1) with the distribution voltage;

an auxiliary choke (Dr1) connected between the distribution voltage and a connection point of a series connection formed of a fifth diode (Dh2) and a fifth electronic switch (Th2) having a first contact thereof connected with an anode of the fifth diode (Dh2), the fifth diode (Dh2) having a cathode thereof connected with an anode of the fifth diode (Dh2), the fifth diode (Dh2) having a cathode of the second diode (D2; D2, D2*), and the fifth electronic switch (Th2) having a second contact thereof connected with the ground and having a control terminal thereof connected with the control circuit; and a fourth electronic switch (Th1) for connecting the auxiliary choke (Dr1) with the distribution voltage and having a control terminal thereof connected with the control circuit; and a fourth diode (Dh1) having an anode thereof connected with the ground and having a cathode thereof connected with a connection point of a fourth electronic switch (Th1) with the auxiliary choke (Dr1).

* * * * *